Nov. 8, 1955 C. B. RICHEY 2,722,875
DELAYED CULTIVATOR LIFT
Filed Aug. 21, 1952 2 Sheets-Sheet 1
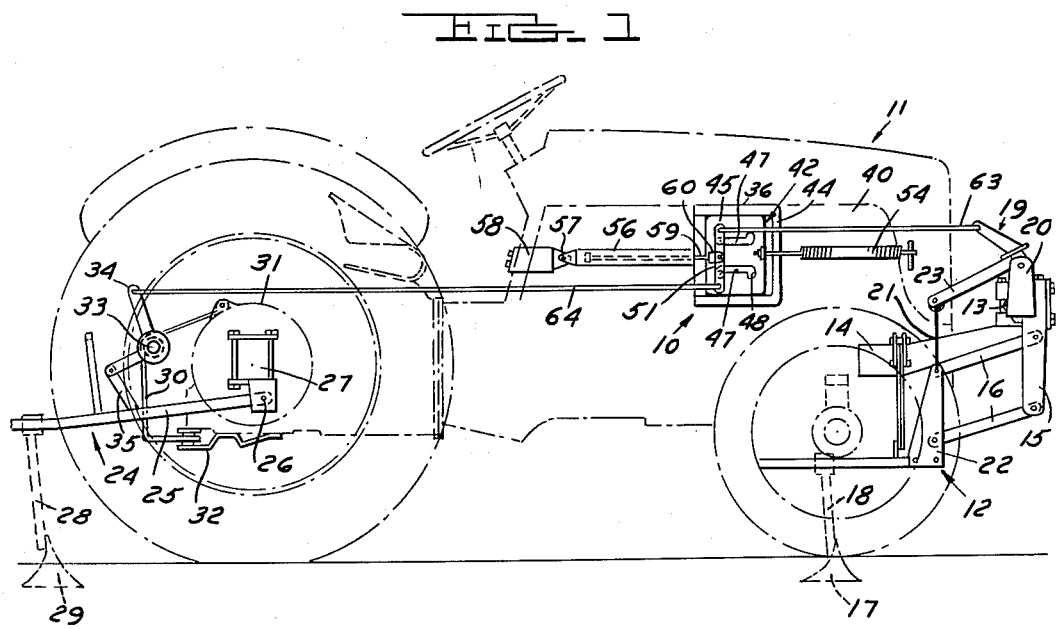
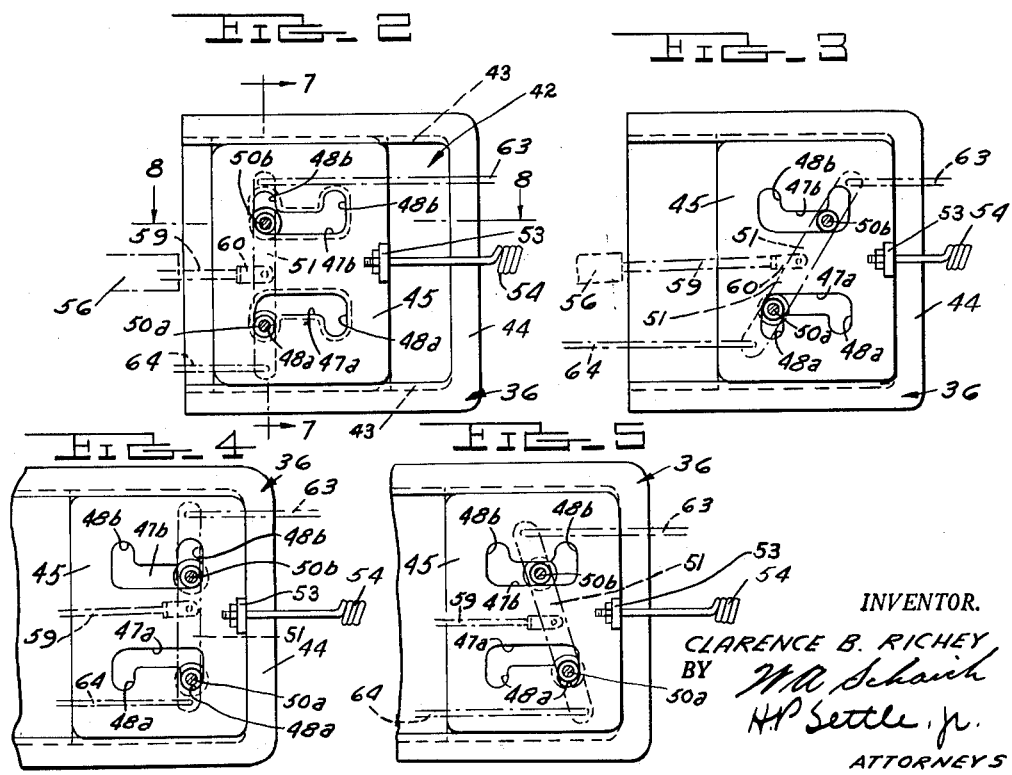
INVENTOR.
CLARENCE B. RICHEY
BY
ATTORNEYS Nov. 8, 1955  C. B. RICHEY  2,722,875
DELAYED CULTIVATOR LIFT
Filed Aug. 21, 1952  2 Sheets-Sheet 2
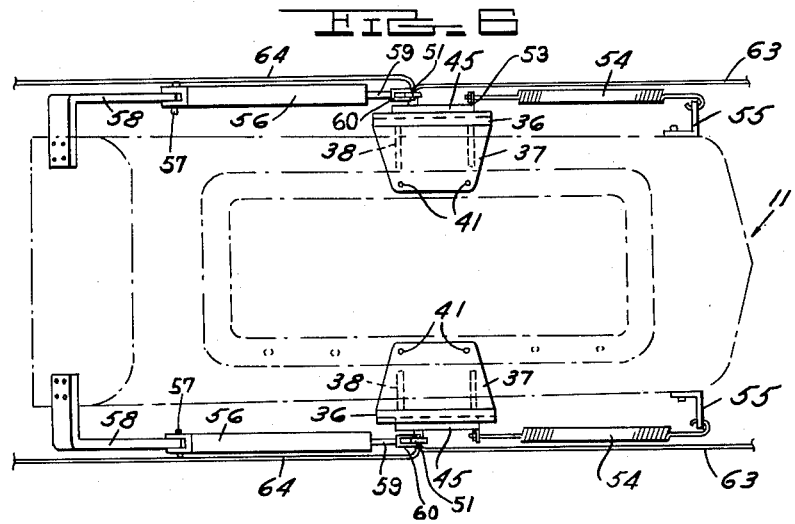
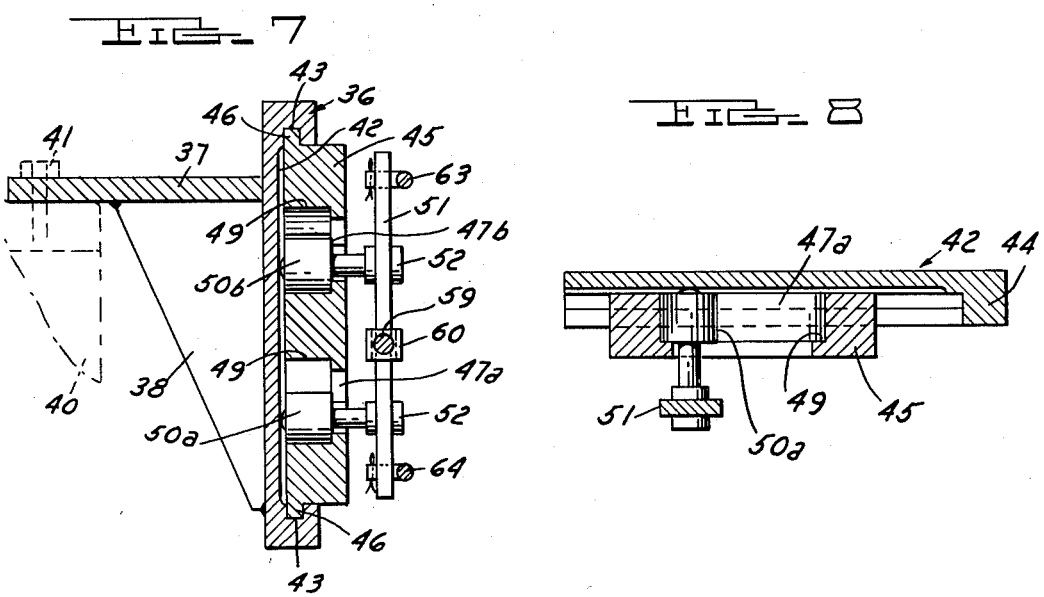
INVENTOR.
CLARENCE B. RICHEY
BY
ATTORNEYS

United States Patent Office 2,722,875
Patented Nov. 8, 1955

2,722,875

DELAYED CULTIVATOR LIFT

Clarence B. Richey, Royal Oak, Mich., assignor, by mesne assignments, to Ford Motor Company, Dearborn, Mich., a corporation of Delaware Application August 21, 1952, Serial No. 305,619

6 Claims. (Cl. 97—46.43)

This invention relates to an improved delayed action lift for implements and particularly for cultivators.

Many crops are planted in evenly spaced rows which facilitate cultivation of such crops, as well as harvesting the crop. When cultivating row crops with a tractor, there are usually provided front and rear cultivating gangs mounted on the tractor which are effective in soil mulching and weed control and, in addition, the earth working elements of the rear gang are so arranged that the tire marks of the tractor are completely eradicated so as to leave a clean, completely worked area after the tractor has finished its cultivating operation.

To avoid damage to the cultivating gangs and to permit cultivation to the extreme end of the rows, it is desirable that the gangs be operated sequentially, i. e., the rear cultivating gang be moved vertically after the front gang is moved vertically. This permits the front gang to be lowered as the tractor enters the rows and by the time the rear end of the tractor has started down the row the rear cultivating gang will engage the soil. When the tractor has reached the ends of the rows, the front cultivator gang is raised while the rear gang stays in the ground until the tractor rear wheels reach the extreme ends of the rows, whereupon the rear cultivating gang will be automatically raised. Thus, the rows are cleanly cultivated their entire length without disturbing the headlands and with the tire tracks completely erased.

Heretofore cultivators available to the farmer which were capable of performing as above outlined had unusually complicated and expensive mechanisms for attaining the desired ends.

Accordingly, it is an object of this invention to provide an improved mechanism for effecting automatic sequential lifting of at least two sets of the earth working elements of an implement.

Another object of this invention is to provide an improved lifting device for cultivators having front and rear cultivating gangs for lifting and lowering of one of such gangs at a delayed interval after the lifting and lowering of the other.

A further object of this invention is to provide an improved delayed lifting device for cultivators which is cam controlled and hydraulically actuated for ease of operation.

Still another object of this invention is to provide an improved cultivator gang lifting device which not only permits delayed lifting and lowering of one of the gangs relative to the other, but also permits selective working depth adjustment of the gangs.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side elevational view of a tractor shown with front and rear mounted cultivating gangs and incorporating an improved delayed lift mechanism constructed in accordance with this invention;

Figure 2 is an enlarged scale, detail view of the cam plate illustrating the position of the cam followers when the cultivating gangs are at their maximum working depth;

Figure 3 is a view similar to Figure 2 but showing the position of the cam plate and cam followers when only the front gang is in its maximum raised position;

Figure 4 is a view similar to Figure 2 but showing the cam plate and cam followers positioned for maximum raising of both the front and rear gangs;

Figure 5 is a view similar to Figure 2 but showing the position of the cam followers when the follower carrier is moved rearwardly to lower the cultivating gangs;

Figure 6 is an enlarged scale, fragmentary plan view of Figure 1, illustrating the manner of mounting the improved delayed cultivator lift on the tractor;

Figure 7 is an enlarged sectional view taken along the plane 7—7 of Figure 2;

Figure 8 is a sectional view taken along the plane 8—8 of Figure 2; and

Figure 9 is an enlarged scale, elevational view of the actuating cylinder.

As shown on the drawings:

In Figure 1 the improved delayed cultivator lift, indicated generally by the numeral 10, is shown mounted on a tractor 11 of well-known make. The tractor 11 has a pair of left and right-hand front mounted cultivator gangs 12, respectively supported in depending relationship from a front mounted tool bar 13 transversely supported by a pair of laterally spaced brackets 14 suitably secured to the tractor front end. The right-hand gang 12 is pivotally mounted by a parallel linkage 16 to a depending arm 15 suitably secured to the tool bar 13. Each cultivating gang 12 has a plurality of cultivating sweeps 17 secured to the lower ends of a corresponding number of depending arms 18 forming part of such gangs. The parallel linkage 16 is connected to a bell-crank lever 19 and such lever is pivotally mounted on the upper end of an upstanding arm 20 provided on the end of the tool bar 13. A link 21 has its ends respectively connected to the upper end of a frame member 22 of the right front cultivator gang 12 and to the lower arm of the bell-crank lever 19. A similar linkage arrangement (not shown) is provided on the other side of the tractor to similarly support the left-hand gang 12.

Rear mounted cultivating gangs 24 comprise essentially a pair of arms 25 pivotally mounted at laterally spaced points 26 on the tractor rear axle housing 27. The rear ends of arms 25 have a plurality of depending sweep supporting arms 28 which have sweeps 29 suitably mounted on their lower ends. A U-shaped strap 30 has its ends respectively connected to the upper portion of the tractor differential housing 31 and the clevis hitch 32 at the bottom of the tractor 11. A transverse shaft 33 is suitably, rotatably journaled on the strap member 30, as best shown in Figure 1, and a pair of bell-crank levers 34 are respectively secured to the shaft 33 at laterally spaced points thereon. The lower arms of bell-crank levers 34 are respectively connected by a pair of links 35 to the pivoted arms 25. Further description of the cultivator gangs is not believed necessary as such gangs form no part of the invention per se, but are included herein only to facilitate the description of the operation of the improved delayed cultivator lift 10 about to be described.

A pair of delayed lift mechanisms 10, respectively mounted on opposite sides of the tractor 11, are utilized for selectively or simultaneously vertically moving the front or rear gangs. As both of such mechanisms are identical, only one thereof will be described. Each delayed lift mechanism 10 comprises a vertically disposed cam housing 36 which has on its back surface a horizontal bracket 37. The bracket 37 is reinforced by a pair of triangularly shaped plates 38 respectively welded to the bracket 37 and to the back surface of the housing 36. The bracket 37 conveniently permits mounting the housing 36 along side the tractor motor 40. The bolts 41 which secure the motor head to the cylinder block are conveniently utilized to mount the bracket 37 thereto. The housing 36 has a rectangular recess 42 provided in its outside face, as best shown in Figures 1 and 2, and a pair of oppositely aligned longitudinal grooves 43 are provided in the upper and lower edges of the recess 42 for a purpose to be presently explained.

The recess 42 defines an integral forward wall 44, while the rear end of the recess 42 opens rearwardly. A rectangular cam plate 45 has a pair of parallel ribs 46 respectively provided on its upper and lower edges and the ribs 46 slidably engage the grooves 43 when the cam plate 45 is inserted into the recess 42 from the open rear end thereof. The cam plate 45 has a pair of horizontal parallel cam tracks or grooves 47a and 47b in its outer face as shown in Figures 1–5. The cam grooves are vertically spaced and the ends 48a of the lower cam groove 47a are turned downwardly, as best shown in Figures 1–5, while the ends 48b of the upper cam grooves 47b are turned upwardly. Thus, the cam grooves are essentially U-shaped grooves. Each of the cam grooves 47a and 47b is undercut, as shown at 49, and a pair of rollers or cam followers 50a and 50b are respectively inserted in the cam grooves 47. The cam followers 50 are connected to an actuating lever or bar 51. A pair of vertically spaced pins 52 are suitably horizontally secured to the bar 51 and such pins rotatably mount the cam followers 50a and 50b thereon. Referring to Figure 2, it will be noted that the upper cam follower 50b rests on the bottom of the cam slot 47b when the lower cam follower 50a rests in the bottom of the vertical arm portion 48a of the groove 47a. Thus, the spacing of the cam followers is greater than the vertical spacing of the horizontal portions of the cam grooves 47a and 47b for a purpose to be later explained.

An integral lug 53 is provided on the forward edge of the cam plate 45 and an adjustable tension spring 54 has its ends respectively connected to the lug 53 and to the tractor front end, as best shown in Figure 6. The tension in spring 54 is preferably adjusted to a degree permitting the spring 54 to shift the cam plate 45 forwardly to the extent permitted by the housing 36, and thus to partially lift both the front and rear gangs unassisted. A double acting hydraulic cylinder 56 has its rear end pivotally secured as by a pin 57 to a bracket 58 suitably secured to the tractor 11. A piston rod 59 projects out of the front end of the cylinder 56 and a clevis 60 is provided on the forward end of the piston rod 59 and such clevis is pivotally secured to a medial portion of the carrier bar 51. The outwardly projecting end of the piston rod 59 has a plurality of axially spaced, annular grooves 61 formed therein and a snap ring 62 is inserted in a selected groove 61 to limit the rearward or inward travel of the piston rod 59 for a purpose to be later explained. Thus, the rearward travel of cam plate 45 is also effectively limited so that cam plate 45 can only move relative to cam housing 36 to a limited degree.

The bell-crank levers 19 associated with the left and right front cultivator gangs 12 have their upper arms respectively connected by a pair of links 63 to the upper ends of the carrier bars 51. A pair of links 64 have their one end respectively connected to the lower ends of the carrier bars 51 and their other end respectively connected to the upper arms of the bell-crank levers 34. Thus, linear movement of links 63 and 64 will effect raising of the cultivator gangs 12 and 24 respectively, as will be later described.

*Operation*

In Figure 1 the cultivating gangs 12 and 24 are positioned for their maximum cultivating depth. In such position, the snap ring 62 is inserted in the foremost groove 61 and the piston rod 59 has been retracted against the bias of spring 54 so that cam plate 47 is in a rearward position relative to housing 36 and the actuator bar 51 is in a vertical position with the cam followers 50a and 50b positioned at the rear ends of the cam grooves 47a and 47b and with the lower cam follower 50a held by gravity in the downturned end 48a of cam groove 47a. Adjustment of the working depth of the cultivator gangs can be made by actuating cylinder 56 to shift piston rod 59 forwardly until cam plate 45 contacts the forward recess wall 44. Even at the extreme position, the cultivating tools are still in ground working position. Upon reaching the end of the row, the operator actuates the hydraulic cylinder 56 to force the piston rod 59 forwardly, whereupon the cam plate 45 is bodily moved forwardly to contact wall 44, and then the upper cam follower 50b in the upper cam groove 47b will be forced forwardly along such upper cam groove. This happens because the lower cam follower 50a is maintained by gravity in the downwardly turned end 48a of its groove 47a and because of the greater spacing of the cam followers 50a and 50b on the carrier bar 51 than the vertical spacing of the grooves 47a and 47b. As the upper cam follower 50b moves forwardly, the link 63 pivots the bell-crank lever 19 in a clockwise direction, as shown in Figure 1, whereupon the front cultivator gang 12 will be vertically raised. Additional forward movement of the piston rod 59 will force the upper cam follower 50b into the upper vertical end 48b of the cam groove 47b, thereby raising the lower cam follower 50a out of the downturned portion 48a of cam groove 47a (Figure 3) so that it may be moved forwardly along the cam groove 47a. Forward linear movement of the lower cam follower 50a will move the link 64 forwardly to rotate the bell-crank lever 34 in a clockwise direction which will then effect raising of the rear cultivator gang 24 so as to bring the sweeps 29 out of the ground at about the time the tractor rear wheels reach the end of the row. At the completion of the forward stroke of piston rod 59, the lower cam follower 50a overlies the vertical arm portion 48a of cam track 47a and drops by gravity into such cam track portion (Figure 4).

With both of the cultivating gangs 12 and 24 raised, the tractor may then be readily turned around on the headland and faced to enter the adjoining uncultivated rows whereupon the cylinder 46 is actuated to withdraw the piston rod 59 and the movement of the cam followers 50 is reversed, but again the upper cam follower 50b moves rearwardly first, the lower cam follower 50a being retained by gravity in the vertical portion 48a (Figure 5) until the upper cam follower 50b can move into the left-hand vertical portion 48b of cam groove 47b, thus producing lowering of the front cultivating gang ahead of the rear cultivating gang 12 as the tractor front wheels enter the row.

It will be appreciated that the operation of only one of the delayed lift mechanisms 10 and its function as regards the cultivating gangs on one side of the tractor has been described. However, as the gangs and the delayed lift mechanisms are identical, it is not believed necessary to describe the operation of the other group. It should be mentioned here that by selective operation of the hydraulic cylinders 56, the gangs 12 and 24 on either side of the tractor may be selectively maintained in either a working or a raised position. Simultaneous operation of cylinders 56, of course, will cause the gangs 12 and 24 to raise or lower in unison.

As previously indicated, the maximum working depth of the cultivating sweeps 17 and 29 may be variably adjusted by selectively inserting the snap ring 62 in a selected annular groove 61 in piston rod 59. When the snap ring 62 abuts the end of the hydraulic cylinder 56, the rearward movement of the piston rod 59 is limited and, hence, the maximum penetration of the sweeps 17 and 29 is controlled. Obviously, other types of stops may be employed to limit the travel of the cam plate 45 to control or vary the working depth of the sweeps 17 and 29.

From the foregoing description it is thus clearly apparent that there is here provided an improved cam operated cultivator gang lifting device of relatively simple design which accomplishes sequential lifting and lowering of the gangs of a tractor mounted cultivator. This improved delayed lift permits raising or lowering of a front gang ahead of a rear gang so as to prevent damage to the cultivator as it moves onto the headland and also to leave the field cleanly cultivated with no tire tracks showing. In addition the gangs on one side of the tractor may be selectively raised or lowered relative to the other to facilitate working end rows and also contour cultivating, where the rows run out on contour line changes.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a tractor mounted implement having a pair of vertically shiftable, ground engaging tools and a linearly movable, power shifting device, the improvements of a mechanism connecting said tools and said power shifting device to produce sequential raising or lowering of said tools, said mechanism comprising an actuator lever, means for respectively connecting the ends of said actuator lever to said tools, whereby linear movements of said ends of said actuator lever along particular parallel paths respectively produce vertical displacements of said tools, means for connecting the medial portion of said actuator lever to said power shifting device to move said actuator lever parallel to said paths, cam followers respectively mounted on the ends of said actuator lever, a first cam track cooperable with one of said cam followers, said first cam track having an active portion permitting linear displacement of said one cam follower along the respective one of said paths and a dwell portion at one end of said active portion permitting only movement of said one cam follower transverse to said one path, a second cam track cooperable with said other cam follower, said second cam track also having an active portion permitting linear displacement of said other cam follower along the other of said paths, said active cam portions being parallel and spaced apart a distance less than the spacing of said cam followers, thereby preventing concurrent movement of said cam followers respectively along the active portions of said cam tracks, but permitting sequential passage of said cam followers respectively along the active portions of said cam tracks.

2. In a tractor mounted implement having a pair of vertically shiftable, ground engaging tools and a linearly movable, power shifting device, the improvements of a mechanism connecting said tools and said power shifting device to produce sequential raising or lowering of said tools, said mechanism comprising an actuator lever, means for respectively connecting the ends of said actuator lever to said tools, whereby linear movements of said ends of said actuator lever along particular parallel paths respectively produce corresponding vertical displacements of said tools, means for connecting the medial portion of said actuator lever to said power shifting device to move said actuator lever parallel to said paths, a cam plate having a pair of U-shaped cam tracks formed thereon, each cam track including arm portions connected by a bight portion, said U-shaped cam tracks having their bight portions parallel and respectively aligned with said paths, said U-shaped cam tracks having their arm portions substantially aligned but oppositely directed, a pair of cam followers respectively mounted adjacent the ends of said actuator lever and spaced apart a distance greater than the spacing of the bight portions of said cam track, said cam followers being respectively cooperable with said cam tracks, whereby one of said cam followers can be moved along the bight portion of its respective cam track only when the other cam follower is disposed in one of the arm portions of its respective cam track, hence producing sequential raising or lowering of said tools.

3. In a tractor mounted implement having a pair of vertically shiftable, ground engaging tools and a linearly movable, power shifting device, the improvements of a mechanism connecting said tools and said power shifting device to produce sequential raising or lowering of said tools, said mechanism comprising an actuator lever, means for respectively connecting the ends of said actuator lever to said tools, whereby linear movements of said ends of said actuator lever along particular parallel paths respectively produce vertical displacements of said tools, means for connecting the medial portion of said actuator lever to said power shifting device to move said actuator lever parallel to said paths, a cam housing stationarily mounted on the tractor, a cam plate slidably mounted on said cam housing for limited movement parallel to said paths, cam followers respectively mounted on the ends of said actuator lever, a first cam track on said cam plate cooperable with one of said cam followers, said first cam track having an active portion permitting linear displacement of said one cam follower along one of said paths and a dwell portion at each end of said active portion permitting only movement of said one cam follower transverse to said paths, a second cam track cooperable with said other cam follower, said second cam track also having an active portion permitting linear displacement of said active cam follower along the other of said paths, said active cam portions being parallel and spaced apart a distance less than the spacing of said cam followers, thereby preventing concurrent movement of said cam followers respectively along the active portions of said cam tracks, but permitting sequential passage of said cam followers respectively along the active portions of said cam tracks, said limited movement of said cam plate relative to said cam housing permitting concurrent adjustment of the vertical position of said tool.

4. In a tractor mounted implement having a pair of vertically shiftable, ground engaging tools and a linearly movable, power shifting device, the improvements of a mechanism connecting said tools and said power shifting device to produce sequential raising or lowering of said tools, said mechanism comprising an actuator lever, means for respectively connecting the ends of said actuator lever to said tools, whereby linear movements of said ends of said actuator lever along particular parallel paths respectively produce corresponding vertical displacements of said tools, means for connecting the medial portion of said actuator lever to said power shifting device to move said actuator lever parallel to said paths, a cam plate having a pair of U-shaped cam tracks formed thereon, each cam track including arm portions connected by a bight portion, said U-shaped cam tracks having their bight portions parallel and respectively aligned with said paths, said U-shaped cam tracks having their arm portions substantially aligned but oppositely directed, a pair of cam followers respectively mounted adjacent the ends of said actuator lever and spaced apart a distance greater than the spacing of the bight portions of said cam track, said cam followers being respectively cooperable with said cam tracks, whereby one of said cam followers can be moved along the bight portion of its respective cam track only when the other cam follower is disposed in one of the arm portions of its respective cam track, hence producing sequential raising or lowering of said tools, and means for mounting said cam plate for limited movement relative to the implement in said tool shifting direction, thereby permitting concurrent adjustment of the vertical position of said tools.

5. The combination defined in claim 4 plus resilient means urging said cam plate toward one extreme position of its said limited movement relative to the implement.

6. For use with a tractor having vertically movable front and rear mounted earth working gangs, a cam plate having a pair of parallel cam grooves therein, means for mounting said cam plate on the tractor, a pair of cam groove follower members respectively insertable in said cam grooves, an actuator lever rigidly connecting said follower members, first link means operatively connected between one of said follower members and the front gang, second link means operatively connected between said other follower member and the rear gang, and power means operatively connected to said actuator lever for moving said lever and said follower members to actuate said link means, each of said cam grooves having oppositely directed retention portions at each end thereof, said cam follower members being spaced apart so that only one follower member can be positioned in any one of said retention portions at a time, thereby producing vertical movements of said front gang ahead of said rear gang.

References Cited in the file of this patent

UNITED STATES PATENTS

| | | |
|---|---|---|
| 2,200,768 | Benjamin | May 14, 1940 |
| 2,309,158 | Benjamin | Jan. 26, 1943 |
| 2,325,870 | Mott | Aug. 3, 1943 |